(12) United States Patent
Ahn et al.

(10) Patent No.: US 8,551,641 B2
(45) Date of Patent: Oct. 8, 2013

(54) POUCH TYPE SECONDARY BATTERY WITH SAFETY MEMBER

(75) Inventors: Changbum Ahn, Yongin-si (KR); Youngbae Sohn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 267 days.

(21) Appl. No.: 12/945,547

(22) Filed: Nov. 12, 2010

(65) Prior Publication Data
US 2011/0129709 A1 Jun. 2, 2011

(30) Foreign Application Priority Data
Nov. 27, 2009 (KR) .................. 10-2009-0115966

(51) Int. Cl.
*H01M 2/02* (2006.01)
*H01M 2/34* (2006.01)
(52) U.S. Cl.
USPC ............ 429/161; 429/163; 429/169; 429/246
(58) Field of Classification Search
USPC .............................. 429/94, 161, 163, 169, 246
See application file for complete search history.

(56) References Cited

U.S. PATENT DOCUMENTS

| | | | |
|---|---|---|---|
| 5,658,683 A * | 8/1997 | Kageyama et al. .............. 429/94 |
| 2006/0105237 A1* | 5/2006 | Oh ............................ 429/161 X |
| 2008/0008927 A1* | 1/2008 | Lee et al. ......................... 429/61 |

FOREIGN PATENT DOCUMENTS

| KR | 10-2005-0014426 A | 2/2005 |
|---|---|---|
| KR | 10-2006-0000101 A | 1/2006 |
| KR | 10-2008-0005621 A | 1/2008 |
| KR | 10-2008-0010735 A | 1/2008 |
| KR | 10-2008-0019311 A | 3/2008 |

OTHER PUBLICATIONS

Korean Notice of Allowance dated Apr. 23, 2011 in Korean Priority Patent Application No. 10-2009-0115966.

* cited by examiner

*Primary Examiner* — Stephen J. Kalafut
(74) *Attorney, Agent, or Firm* — Christie, Parker & Hale, LLP

(57) ABSTRACT

A pouch type secondary battery including a safety member. The pouch type secondary battery includes an electrode assembly including first and second electrode plates having opposite electrical polarities and a first separator between the first and second electrode plates; and a safety member including a first conductive plate located on an outside of the electrode assembly and electrically connected to the first electrode plate, a second conductive plate located on an outside of the first conductive plate and electrically connected to the second electrode plate, and an insulating plate between the first and second conductive plates for insulating the first and second conductive plates from each other, and the first conductive plate has a puncture strength that is greater than a puncture strength of the second conductive plate.

20 Claims, 5 Drawing Sheets

POUCH TYPE SECONDARY BATTERY WITH SAFETY MEMBER

CROSS-REFERENCE TO RELATED APPLICATION

This application claims priority to and the benefit of Korean Patent Application No. 10-2009-0115966, filed on Nov. 27, 2009, the entire content of which is incorporated herein by reference.

BACKGROUND

1. Field

Aspects of embodiments of the present invention relate to a pouch type secondary battery including a safety member.

2. Description of the Related Art

In general, since a pouch type secondary battery is accommodated in a thin-film pouch casing, it is more vulnerable to damage from external impact than a can-type secondary battery. In particular, when a sharp conductive object such as a pin penetrates into a thin-film pouch, it may pierce a jelly roll housed in the pouch, resulting in damage caused to the jelly roll. Penetration of the pin may also cause a short circuit between positive and negative electrode plates and a temporary overcurrent, which may cause a fire.

SUMMARY

According to an aspect of embodiments of the present invention, a pouch type secondary battery is capable of preventing or reducing heat from being generated within an electrode assembly by bypassing overcurrent flowing within the electrode assembly outside of the electrode assembly when the secondary battery is pierced by an external conductive material.

According to another aspect of embodiments of the present invention, a pouch type secondary battery is configured to minimize or reduce the occurrence of accidents due to overcurrent by discharging an electrode assembly before an external conductive material penetrates into the battery.

According to one embodiment of the present invention, a pouch type secondary battery includes an electrode assembly including first and second electrode plates having opposite electrical polarities and a first separator between the first and second electrode plates; and a safety member including a first conductive plate located on an outside of the electrode assembly and electrically connected to the first electrode plate, a second conductive plate located on an outside of the first conductive plate and electrically connected to the second electrode plate, and an insulating plate between the first and second conductive plates for insulating the first and second conductive plates from each other, and the first conductive plate has a puncture strength that is greater than a puncture strength of the second conductive plate.

The electrode assembly may be wound in a jelly roll shape with the separator located at an outermost circumference thereof. In one embodiment, the safety member has an area that is substantially the same as an area of an outer surface of the electrode assembly. In another embodiment, the safety member has an area corresponding to an area of a portion of an outer surface of the electrode assembly.

In one embodiment, the electrode assembly further includes a first electrode tab protruding from a side of the electrode assembly and electrically connected to the first electrode plate, and the first conductive plate is electrically connected to the first electrode tab. The first conductive plate may include a first base located on an outer surface of the electrode assembly and a first connecting tab electrically connecting the first electrode tab and the first base. In addition, the first base may be integrally formed with the first connecting tab. The first conductive plate may include a same material as the first electrode tab. In addition, the first conductive plate may include copper (Cu).

In one embodiment, the electrode assembly further includes a second electrode tab protruding from a side of the electrode assembly and electrically connected to the second electrode plate, and the second conductive plate is electrically connected to the second electrode tab. In addition, the second conductive plate may include a second base located on an outer surface of the insulating plate, and a second connecting tab electrically connecting the second electrode tab and the second base. Further, the second base may be integrally formed with the second connecting tab. The second conductive plate may include a same material as the second electrode tab. Further, the second conductive plate may include aluminum (Al).

The insulating plate may include a polyolefin. The polyolefin may include a material selected from the group consisting of polyethylene, polypropylene, polyisobutylene, and combinations thereof. The insulating plate may include a ceramic layer. The ceramic layer may include a material selected from the group consisting of aluminum oxide ($Al_2O_3$), barium titanate ($BaTiO_4$), and titanium oxide ($TiO_2$).

In one embodiment, a thickness of the first conductive plate is greater than or equal to 50 μm. In one embodiment, a thickness of the second conductive plate is greater than or equal to 50 μm. A thickness of the insulating plate may be greater than or equal to 20 μm. The pouch type secondary battery may be a pouch type lithium secondary battery.

According to an aspect of embodiments of the present invention, when a conductive material externally penetrates into a pouch type secondary battery, overcurrent flowing in an electrode assembly can be bypassed via a safety member, thereby preventing or reducing heat from being generated within the electrode assembly while reducing a risk of explosion or fire of the battery.

According to another aspect of embodiments of the present invention, a pouch type secondary battery can be discharged before penetration by an external conductive material, thereby minimizing or reducing the occurrence of accidents caused by the penetration.

Additional aspects and/or advantages of embodiments of the present invention are set forth in the following description and accompanying drawings, or may be obvious in view thereof to those skilled in the art.

BRIEF DESCRIPTION OF THE DRAWINGS

The above and other features and advantages will become more apparent to those of ordinary skill in the art by describing in detail some exemplary embodiments of the present invention with reference to the attached drawings, in which.

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

Figure 1:
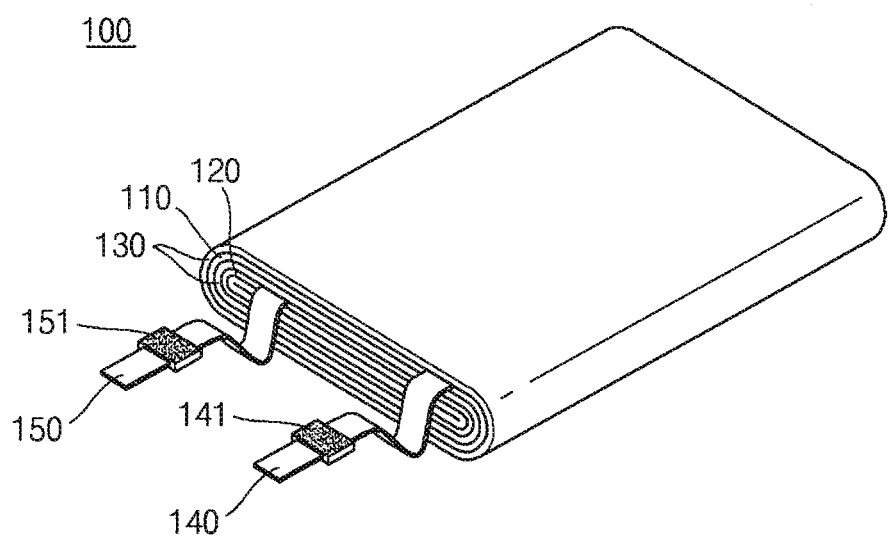
FIG. 1 is a perspective view of an electrode assembly according to an embodiment of the present invention.
Figure 2:
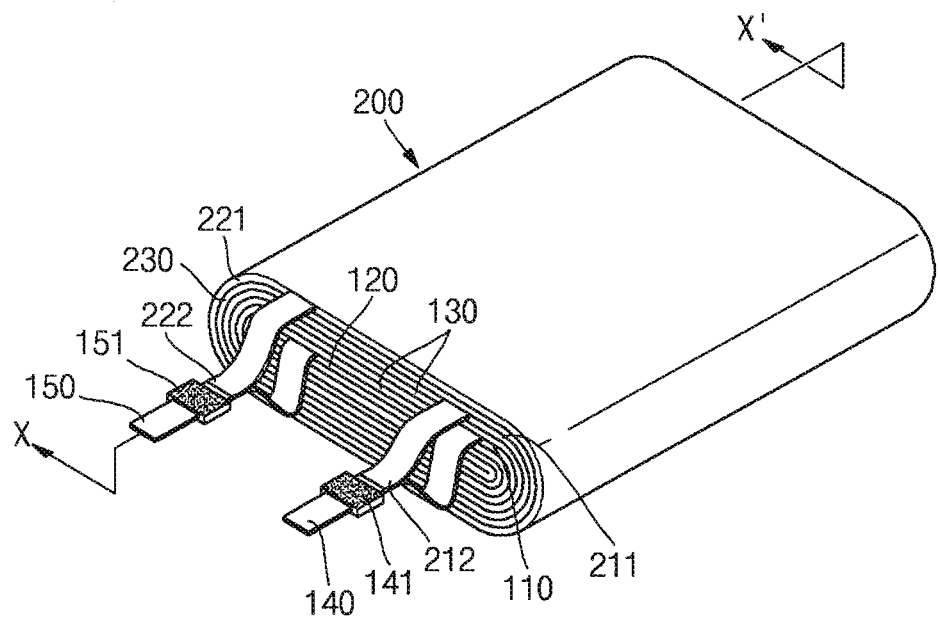
FIG. 2 is a perspective view of an electrode assembly having a safety member according to an embodiment of the present invention.
Figure 3:
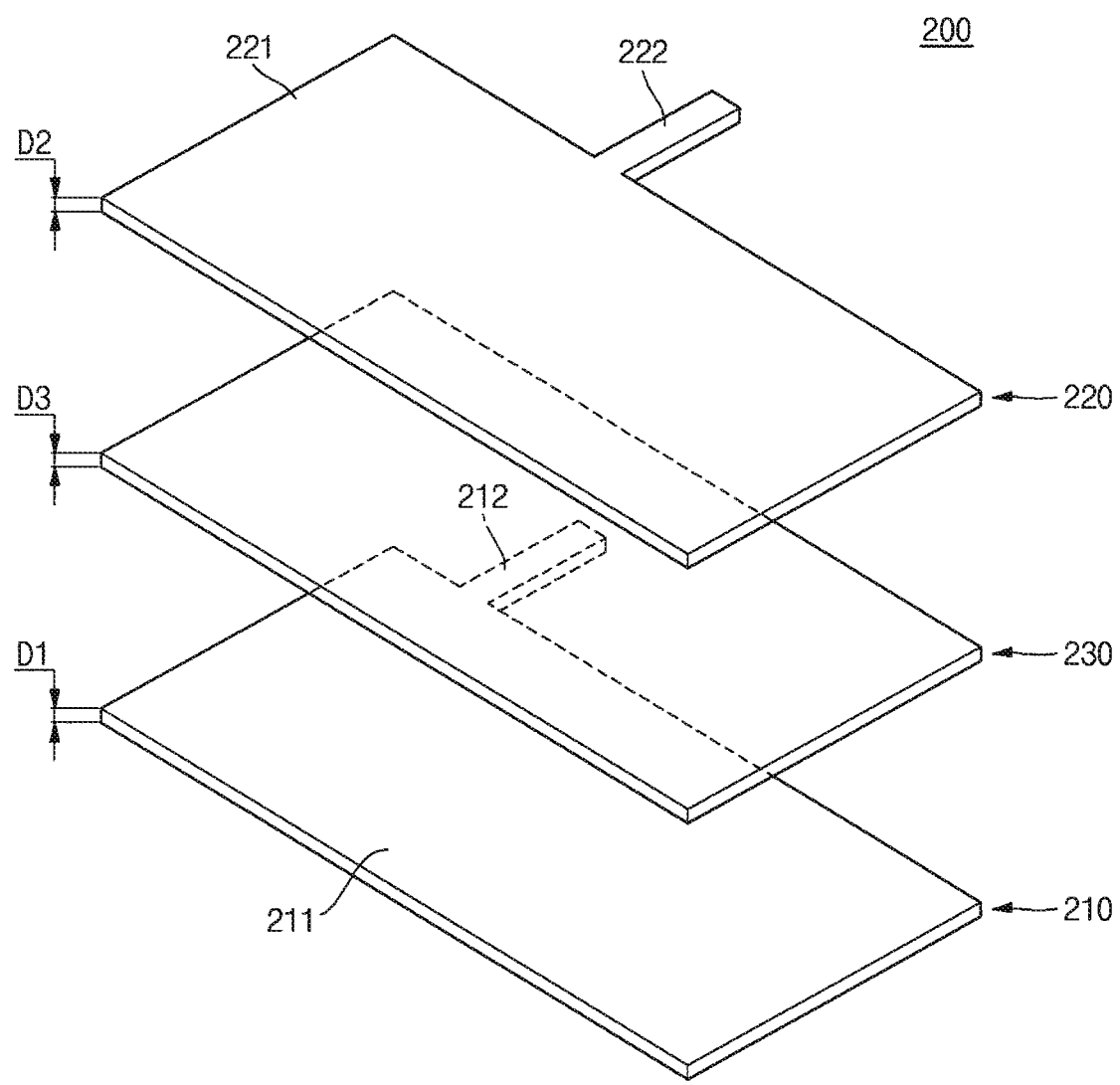
FIG. 3 is an exploded perspective view of a safety member according to an embodiment of the present invention.
Figure 4:
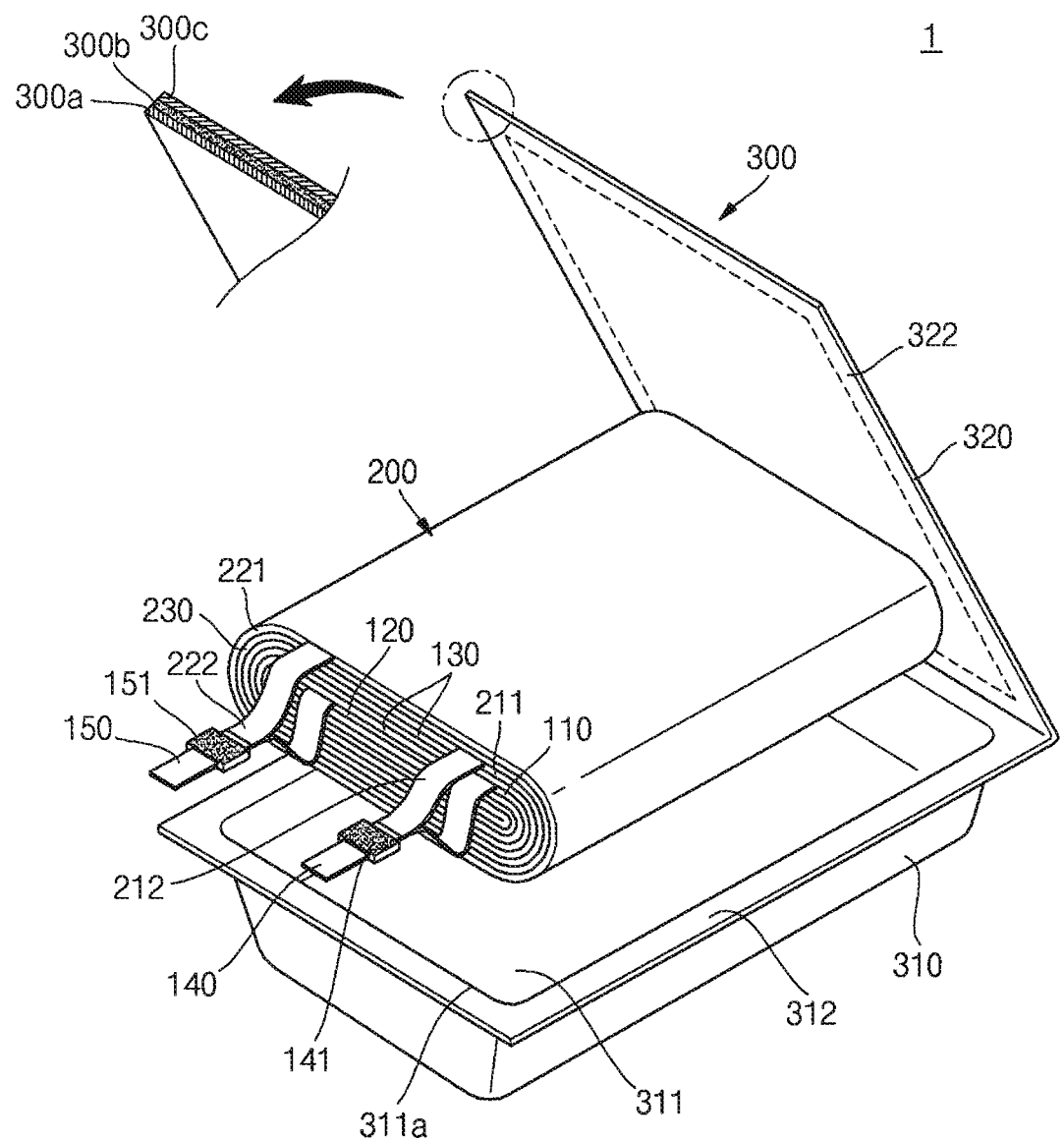
FIG. 4 is a partially exploded perspective view of a pouch type secondary battery according to an embodiment of the present invention.

FIG. 1 is a perspective view of an electrode assembly 100 according to an embodiment of the present invention. FIG. 2 is a perspective view of an electrode assembly having a safety member 200 according to an embodiment of the present invention. FIG. 3 is an exploded perspective view of the safety member 200 according to an embodiment of the present invention. FIG. 4 is a partially exploded perspective view of a pouch type secondary battery 1 according to an embodiment of the present invention.

Referring to FIGS. 1 through 4, the pouch type secondary battery 1 according to an embodiment includes the electrode assembly 100, the safety member 200, and a pouch 300. In one embodiment, the pouch type secondary battery 1 is a pouch type lithium secondary battery.

The electrode assembly 100, in one embodiment, includes first and second electrode plates 110 and 120 having opposite polarities, a separator 130 interposed between the first and second electrode plates 110 and 120, and first and second electrode tabs 140 and 150. The first and second electrode plates 110 and 120 and the separator 130, in one embodiment, are wound in a jelly roll shape. Although FIG. 1 shows a jelly roll type electrode assembly, embodiments of the present invention are not limited thereto and may include a stacking type or stacking/folding type electrode assembly. The separator 130, in one embodiment, is located at the outermost circumference of the electrode assembly 100.

The first electrode plate 110 may be a positive or negative electrode plate. However, for convenience of explanation, the first electrode plate 110 is hereinafter described as a negative electrode plate. The first electrode plate 110 may contain a negative electrode collector (not shown) and a negative electrode active material (not shown). The negative electrode collector may be a thin copper (Cu) foil or any other suitable material, and the negative electrode active material may include a carbon material as a main component. The negative electrode active material may be applied on both surfaces of the negative electrode collector. In one embodiment, a negative electrode non-coating portion (not shown) that is not coated with the negative electrode active material is located at both ends of the negative electrode collector.

The second electrode plate 120 has an opposite electrical polarity to the first electrode plate 110. The second electrode plate 120 may be a positive electrode plate or a negative electrode plate. For convenience of explanation, the second electrode plate 120 is hereinafter described as a positive electrode plate. The second electrode plate 120 may contain a positive electrode collector (not shown) and a positive electrode active material (not shown). The positive electrode collector may be a thin aluminum (Al) foil or any other suitable material. The positive electrode active material may include lithium-based oxide as a main component. The positive electrode active material may be applied on both surfaces of the positive electrode collector. In one embodiment, a positive electrode non-coating portion (not shown) that is not coated with the positive electrode active material is located at both ends of the positive electrode collector.

The separator 130, in one embodiment, is made of an electrically insulating material such as polyethylene or polyolefin including polypropylene. In one embodiment, the separator 130 may include a porous ceramic layer. The separator 130 is interposed between the first and second electrode plates 110 and 120 and provides a lithium ion path during charging/discharging.

The first electrode tab 140, in one embodiment, is formed of a conductive material such as Cu, Ni, or Al. The first electrode tab 140, in one embodiment, is electrically connected to the first electrode plate 110, protrudes from one side of the electrode assembly 100, and extends outward from the pouch 300. A first insulating tape 141 may be adhered or otherwise attached to a side of the first electrode tab 140.

A portion of the first electrode tab 140 that comes into contact with the pouch 300 is wrapped with the first insulating tape 141, in one embodiment, so as to prevent or substantially prevent a short circuit between the first electrode tab 140 and a metal layer of the pouch 300.

The second electrode tab 150, in one embodiment, is formed of a conductive material such as Cu, Ni, or Al. The second electrode tab 150, in one embodiment, is electrically connected to the second electrode plate 120, protrudes from one side of the electrode assembly 100, and extends outward from the pouch 300. A second insulating tape 151 may be adhered or otherwise attached to a side of the second electrode tab 150.

A portion of the second electrode tab 150 that comes into contact with the pouch 300 is wrapped with the second insulating tape 151, in one embodiment, so as to prevent or substantially prevent a short circuit between the second electrode tab 150 and a metal layer of the pouch 300.

The safety member 200 is located on an outside of the electrode assembly 100 and, in one embodiment, has an area corresponding to an outer surface of the electrode assembly 100 to surround the outer surface of the electrode assembly 100. An inner surface of the safety member 200, in one embodiment, is attached to the outer surface of the electrode assembly 100 using an adhesive. In another embodiment, unlike in FIG. 2, the safety member 200 may be formed such that it corresponds to a portion of the outer surface of the electrode assembly 100. When a conductive material externally penetrates into the pouch type secondary battery 1, the safety member 200 is configured to allow current flowing through the electrode assembly 100 to detour to the outside of the electrode assembly 100 so as to bypass the electrode assembly 100. The safety member 200, in one embodiment, includes a first conductive plate 210, a second conductive plate 220, and an insulating plate 230.

The first conductive plate 210 is formed of a conductive material. In one embodiment, the first conductive plate 210 has greater puncture strength than the second conductive plate 220. The term "puncture strength" is used herein to refer to a force sufficient to penetrate into the pouch type secondary battery 1. The first conductive plate 210, in one embodiment, is formed of the same material as the first electrode tab 140. Moreover, in one embodiment, the first electrode tab 140 and the first conductive plate 210 are formed of Cu. The first conductive plate 210, in one embodiment, has a thickness D1 of greater than or equal to 50 μm. The first conductive plate 210 is disposed on the outside of the electrode assembly 100. When a conductive material externally penetrates into the pouch type secondary battery 1, the first conductive plate 210 bypasses the current flowing in the electrode assembly 100 outside of the electrode assembly 100 while at the same time dissipating heat outside the electrode assembly 100. Further, due to its high puncture strength, the first conductive plate 210 can prevent, substantially prevent, or delay penetration of a sharp conductive material, such as a pin, into the electrode assembly 100. The first conductive plate 210, in one embodiment, includes a first base 211 and a first connecting tab 212.

The first base 211, in one embodiment, covers the entire outer surface of the electrode assembly 100. The first base 211, in one embodiment, is attached to the outer surface of the electrode assembly 100 using an adhesive. Further, as described above, the thickness D1 of the first base 211, in one embodiment, is greater than or equal to 50 μm. If the thickness D1 is less than 50 μm, the resistance of the first base 211 is increased, so that current flowing through the electrode assembly 100 is not bypassed as effectively.

The first connecting tab 212, in one embodiment, is integrally formed with the first base 211. The first connecting tab 212 electrically connects the first base 211 with the first electrode tab 140. Since the first connecting tab 212, in one embodiment, is made of the same material as the first electrode tab 140, contact resistance can be reduced when the first connecting tab 212 makes contact with the first electrode tab 140.

The second conductive plate 220, in one embodiment, is formed of the same conductive material as the second electrode tab 150. Moreover, in one embodiment, the second electrode tab 150 and the second conductive plate 220 are formed of Al. The second conductive plate 220 is disposed on an outside of the first conductive plate 210 and, in one embodiment, has a thickness D2 of greater than or equal to 50 μm. When a conductive material penetrates into the pouch type secondary battery 1, the second conductive plate 220 bypasses the current flowing in the electrode assembly 100 outside of the electrode assembly 100. The second conductive plate 220, in one embodiment, includes a second base 221 and a second connecting tab 222.

The second base 221 covers an outer surface of the first base 211 and, in one embodiment, has a thickness D2 of greater than or equal to 50 μm. If the thickness D2 is less than 50 μm, the second base 221 has increased resistance so that it cannot bypass current flowing through the electrode assembly 100 as effectively. The second base 221, in one embodiment, has lower puncture strength than the first base 211 so that the penetrating conductive material can easily contact the first conductive plate 210.

The second connecting tab 222, in one embodiment, is integrally formed with the second base 221. The second connecting tab 222 electrically connects the second base 221 with the second electrode tab 150. Because the second connecting tab 222, in one embodiment, is made of the same material as the second electrode tab 150, contact resistance can be reduced when the second connecting tab 222 makes contact with the second electrode tab 150.

The insulating plate 230, in one embodiment, is made of polyolefin. The polyolefin may be one material or a combination of materials selected from the group consisting of polyethylene, polypropylene, and polyisobutylene. Alternatively, the insulating plate 230 may include a ceramic layer including at least one of aluminum oxide ($Al_2O_3$), barium titanate ($BaTiO_4$), and titanium oxide ($TiO_2$). The insulating plate 230, in one embodiment, has a thickness D3 of greater than or equal to 20 μm. The insulating plate 230 is disposed between the first and second conductive plates 210 and 220, and more specifically, between the first and second bases 211 and 221. The insulating plate 230 electrically insulates the first conductive plate 210 from the second conductive plate 220. If the first base 211 has a thickness D1 of greater than 50 μm, a burr having a thickness of greater than 20 μm may be produced in cutting the first conductive plate 210 in a predetermined size. Further, if the second base 221 has a thickness D2 of greater than 50 μm, a burr having a thickness of greater than 20 μm may be generated in cutting the second conductive plate 220 in a predetermined size. The burrs may cause a short circuit between the first and second conductive plates 210 and 220. Thus, in one embodiment, to prevent or substantially prevent a short circuit caused by the burrs, the insulating plate 230 may have a thickness D3 of greater than or equal to 20 μm.

The pouch 300, in one embodiment, includes a cast polypropylene (CPP) layer 300a, a metal thin layer 300b, and an insulating layer 300c sequentially formed from an inner surface thereof in which the electrode assembly 100 is accommodated. In one embodiment, the CPP layer 300a is made of an organic/inorganic composite material, and the metal thin layer 300b and the insulating layer 300c are made of Al and nylon, respectively. The pouch 300, in one embodiment, includes lower and upper cases 310 and 320 coupled together (e.g., hinged in the middle thereof). The lower and upper cases 310 and 320 make contact with each other to seal the inside of the pouch 300.

In one embodiment, the lower case 310 of the pouch 300 includes a receiving portion 311 configured to receive the electrode assembly 100 therein and a lower sealing portion 312.

The receiving portion 311 may be formed by pressing the lower case 310 of the pouch 300 so as to accommodate the electrode assembly 100.

The lower sealing portion 312 extends from a top side 311a of the receiving portion 311. An upper sealing portion 322 is formed at a region of the upper case 320 corresponding to the lower sealing portion 312.

The upper sealing portion 322, in one embodiment, is attached to the lower sealing portion 312 by applying heat and pressure, thereby providing a seal within the pouch 300.

At this juncture, the puncture strength is conventionally proportional to a tensile strength. In other words, if the puncture strength of the some material is relatively high, then the tensile strength itself is also relatively high. In general, the tensile strength is different on the terms of alloy composition, but the tensile strength of copper is generally higher than that of aluminum. That is, the tensile strength of copper is approximately 22 $N/mm^2$, while the tensile strength of aluminum is approximately 10 $N/mm^2$. Therefore, the puncture strength of copper is approximately twice higher than that of the aluminum. If the first conductive plate is copper, and the second conductive plate is aluminum, then the puncture strength of the first conductive plate is substantially higher than that of the second conductive plate.

A pouch type secondary battery according to another embodiment of the present invention is described with reference to FIG. 5.

Figure 5:
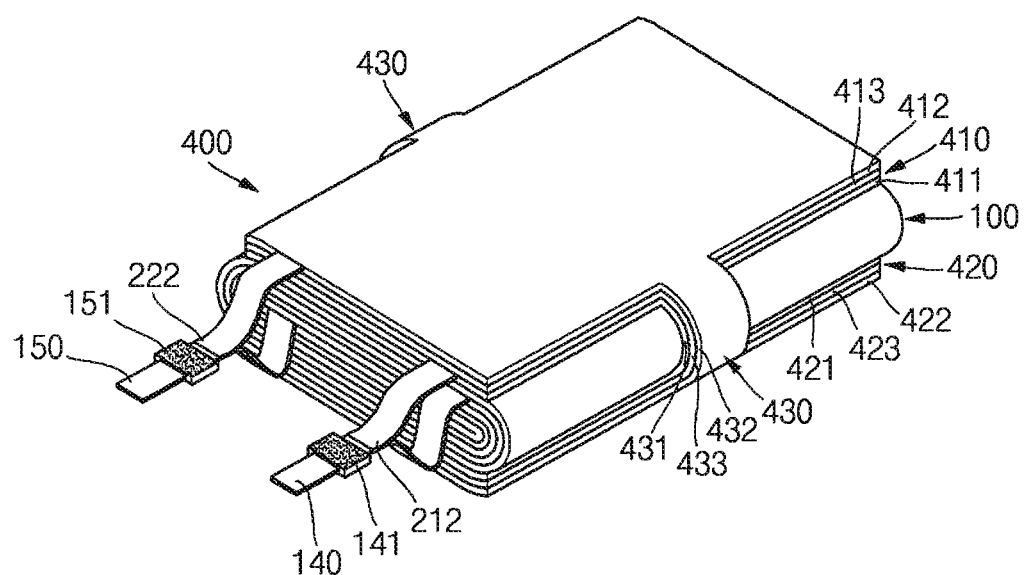
FIG. 5 is a perspective view of an electrode assembly having a safety member according to another embodiment of the present invention.

FIG. 5 is a perspective view of an electrode assembly 100 equipped with a safety member 400 according to another embodiment of the present invention.

Referring to FIG. 5, the safety member 400 according to one embodiment is wound around an outer surface of the electrode assembly 100 except for portions of two opposite sides of the electrode assembly 100 having a smaller area. The safety member 400 includes an upper safety member 410, a lower safety member 420, and at least one connection part 430.

The upper safety member 410 includes first and second upper conductive plates 411 and 412 and an upper insulating plate 413. The first upper conductive plate 411, in one embodiment, covers an entire area of a first long side of the electrode assembly 100 having a larger area than short sides thereof. The first upper conductive plate 411, in one embodiment, is attached to the first long side of the electrode assembly 100 using an adhesive. The second upper conductive plate 412, in one embodiment, has an area equal or substantially equal to the first upper conductive plate 411 and is positioned on (i.e. outside) the first upper conductive plate 411. The upper insulating plate 413 is sandwiched between the first and second upper conductive plates 411 and 412 and electrically insulates the first upper conductive plate 411 from the second upper conductive plate 412.

The lower safety member 420 is disposed on a second long side opposing the first long side and includes first and second lower conductive plates 421 and 422 and a lower insulating plate 423. The first lower conductive plate 421, in one embodiment, covers an entire area of a second long side of the electrode assembly 100. The first lower conductive plate 421, in one embodiment, is attached to the second long side of the electrode assembly 100 using an adhesive. The second lower conductive plate 422, in one embodiment, has an area equal or substantially equal to the first lower conductive plate 421 and is positioned under (i.e. outside) the first lower conductive plate 421. The lower insulating plate 423 is sandwiched between the first and second lower conductive plates 421 and 422 and electrically insulates the first lower conductive plate 421 from the second lower conductive plate 422.

The connection parts 430 are located on two short sides of the electrode assembly 100 having a smaller area so as to open portions of the two short sides. The connection parts 430 join the upper safety member 410 with the lower safety member 420. The connection parts 430 include first and second connection conductive plates 431 and 432 and a connection insulating plate 433. The first connection conductive plate 431 is attached to the short sides so as to electrically connect the first upper conductive plate 411 with the first lower conductive plate 412. The second connection conductive plate 432 electrically connects the second upper conductive plate 412 with the second lower conductive plate 422. The upper insulating plate 413 is connected to one end of the connection insulating plate 433 while the lower insulating plate 423 is connected to the other end thereof. The connection insulating plate 433 is interposed between the upper and lower insulating plates 413 and 423 and electrically insulates the first connection conductive plate 431 from the second connection conductive plate 432.

Figure 6A:
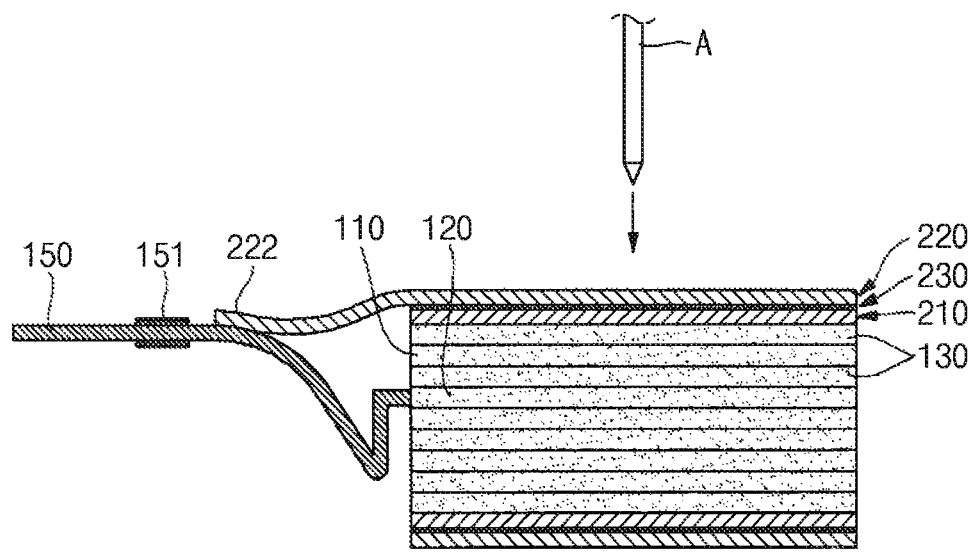
FIGS. 6A to 6C are sectional views of the electrode assembly having a safety member of FIG. 2, taken along the line X-X' illustrating the operation of a pouch type secondary battery according to an embodiment of the present invention.
Figure 6B:
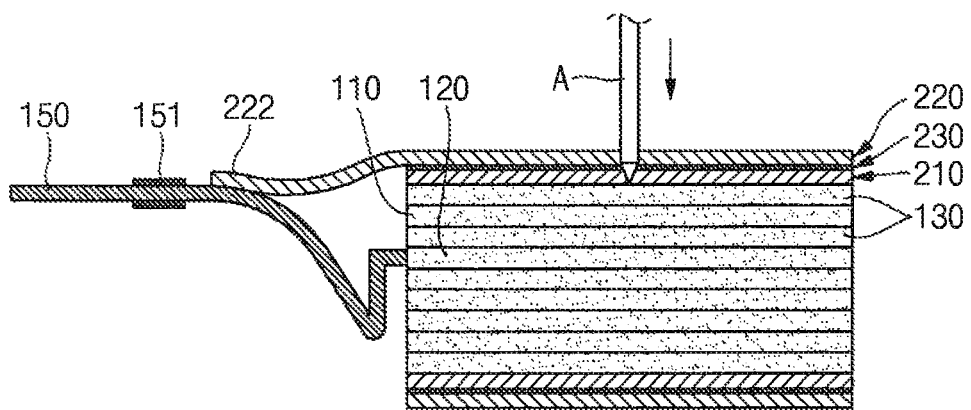
Figure 6C:
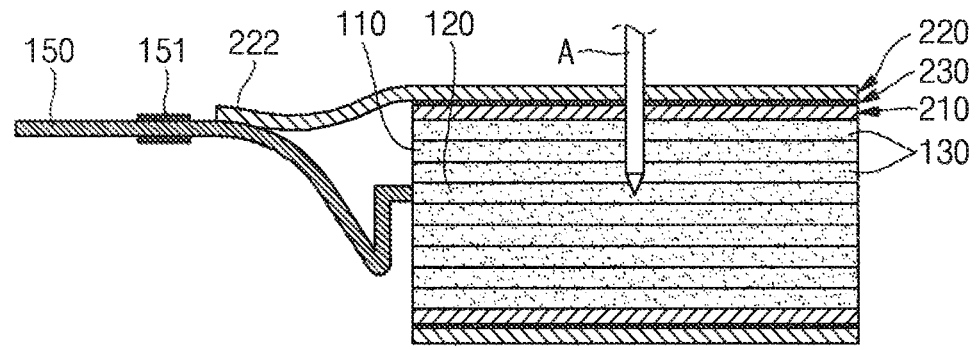

The operation of a pouch type secondary battery according to an embodiment of the present invention is described with reference to FIGS. 1, 2, and 6A through 6C. FIGS. 6A through 6C are cross-sectional views of the pouch type secondary battery according to an embodiment of the present invention taken along line X-X' of FIG. 2.

FIG. 6A illustrates a state in which a needle-shaped conductive material A approaches an outer surface of the pouch type secondary battery for penetration.

FIG. 6B illustrates a state in which the conductive material A is penetrating into the first conductive plate 210 after penetrating through the second conductive plate 220 and the insulating plate 230. Here, the safety member 200 may discharge the electrode assembly 100 before the conductive material A penetrates into the electrode assembly 100. More specifically, when the conductive material A reaches the first conductive plate 210, the first electrode plate 110, the first electrode tab 140, the first conductive plate 210, the conductive material A, the second conductive plate 220, the second electrode tab 150, and the second electrode plate 120 are connected to each other to form a closed loop. The electrode assembly 100 is discharged via the closed loop. Further, the first conductive plate 210 having greater puncture strength than the second conductive plate 220 prevents or substantially prevents the conductive material A from reaching the electrode assembly 100, or at least provides time for discharging the current in the electrode assembly 100. When a force strong enough to pierce the first conductive plate 210 is applied, the conductive material A may penetrate into the first conductive plate 210.

FIG. 6C illustrates a state in which the conductive material A penetrates into the electrode assembly 100, thereby causing a short circuit between the first and second electrode plates 110 and 120. In this case, even if a temporary overcurrent is generated, most of the overcurrent may be bypassed from the inside of the electrode assembly 100 to the first and second conductive plates 210 and 220 having smaller resistance than the electrode assembly 100, thereby preventing excessive heat from being generated within the electrode assembly 100. Further, since the electrode assembly 100 is partially discharged before the short circuit occurs, as shown in and described above with reference to FIG. 6B, the time during which current flows within the electrode assembly 100 can be minimized or reduced. Therefore, a risk of accidents caused by overcurrent that occurs when the conductive material A penetrates into the electrode assembly 100 is reduced.

Some exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A pouch type secondary battery comprising:
   an electrode assembly comprising first and second electrode plates having opposite electrical polarities and a first separator between the first and second electrode plates; and
   a safety member comprising a first conductive plate located on an outside of the electrode assembly and electrically connected to the first electrode plate, a second conductive plate located on an outside of the first conductive plate and electrically connected to the second electrode plate, and an insulating plate between the first and second conductive plates for insulating the first and second conductive plates from each other,
   wherein the first conductive plate has a puncture strength that is greater than a puncture strength of the second conductive plate, 2. The pouch type secondary battery of claim 1, wherein the electrode assembly is wound in a jelly roll shape with the separator located at an outermost circumference thereof.

3. The pouch type secondary battery of claim 1, wherein the safety member has an area that is substantially the same as an area of an outer surface of the electrode assembly.

4. The pouch type secondary battery of claim 1, wherein the safety member has an area corresponding to an area of a portion of an outer surface of the electrode assembly.

5. The pouch type secondary battery of claim 1, wherein the electrode assembly further comprises a first electrode tab protruding from a side of the electrode assembly and electrically connected to the first electrode plate, and wherein the first conductive plate is electrically connected to the first electrode tab.

6. The pouch type secondary battery of claim 5, wherein the first conductive plate comprises a first base located on an outer surface of the electrode assembly, and a first connecting tab electrically connecting the first electrode tab and the first base.

7. The pouch type secondary battery of claim 6, wherein the first base is integrally formed with the first connecting tab.

8. The pouch type secondary battery of claim 5, wherein the first conductive plate comprises a same material as the first electrode tab.

9. The pouch type secondary battery of claim 8, wherein the first conductive plate comprises copper (Cu).

10. The pouch type secondary battery of claim 1, wherein the electrode assembly further comprises an electrode tab protruding from a side of the electrode assembly and electrically connected to the second electrode plate, and wherein the second conductive plate is electrically connected to the electrode tab.

11. The pouch type secondary battery of claim 10, wherein the second conductive plate comprises a base located on an outer surface of the insulating plate, and a connecting tab electrically connecting the electrode tab and the base.

12. The pouch type secondary battery of claim 11, wherein the base is integrally formed with the connecting tab.

13. The pouch type secondary battery of claim 10, wherein the second conductive plate comprises a same material as the electrode tab.

14. The pouch type secondary battery of claim 13, wherein the second conductive plate comprises aluminum (Al).

15. The pouch type secondary battery of claim 1, wherein the insulating plate comprises a polyolefin.

16. The pouch type secondary battery of claim 15, wherein the polyolefin comprises a material selected from the group consisting of polyethylene, polypropylene, polyisobutylene, and combinations thereof.

17. The pouch type secondary battery of claim 1, wherein the insulating plate comprises a ceramic layer.

18. The pouch type secondary battery of claim 17, wherein the ceramic layer comprises a material selected from the group consisting of aluminum oxide ($Al_2O_3$), barium titanate ($BaTiO_4$), and titanium oxide ($TiO_2$).

19. The pouch type secondary battery of claim 1, wherein a thickness of the first conductive plate is greater than or equal to 50 μm, and
   wherein a thickness of the second conductive plate is greater than or equal to 50 μm.

20. The pouch type secondary battery of claim 19, wherein a thickness of the insulating plate is greater than or equal to 20 μm.

* * * * *

UNITED STATES PATENT AND TRADEMARK OFFICE
CERTIFICATE OF CORRECTION

| | | |
|---|---|---|
| PATENT NO. | : 8,551,641 B2 | Page 1 of 1 |
| APPLICATION NO. | : 12/945547 | |
| DATED | : October 8, 2013 | |
| INVENTOR(S) | : Chang-Bum Ahn et al. | |

It is certified that error appears in the above-identified patent and that said Letters Patent is hereby corrected as shown below:

In the claims:

Col. 8, line 56, Claim 1      Delete "plate,",
                              Insert --plate.--

Signed and Sealed this
Twenty-fourth Day of March, 2015

Michelle K. Lee
*Director of the United States Patent and Trademark Office*